United States Patent [19]

Abraham et al.

[11] Patent Number: 4,639,875
[45] Date of Patent: Jan. 27, 1987

[54] QUANTITY CHECKING SYSTEM AND METHOD

[76] Inventors: Joseph N. Abraham, 4290 Silsby Rd., University Heights, Ohio 44118; Donald S. Scipione, 2427 Woodmere Dr., Cleveland Heights, Ohio 44106

[21] Appl. No.: 611,509

[22] Filed: May 17, 1984

[51] Int. Cl.$^4$ ............... G06F 15/20; G06F 15/226; G06G 7/48
[52] U.S. Cl. .................. 364/479; 364/403; 235/385; 235/381; 235/424; 221/2; 221/4; 377/13; 377/15
[58] Field of Search ............ 364/403, 479; 235/375, 235/383, 385, 381, 424, 425; 194/1 N, 4 R; 221/2, 4, 7; 377/13, 15

[56] References Cited

U.S. PATENT DOCUMENTS

| | | | |
|---|---|---|---|
| 3,637,989 | 1/1972 | Howard et al. | 235/383 |
| 3,674,173 | 7/1972 | Scarneccia et al. | 221/6 |
| 3,737,070 | 6/1973 | O'Neal | 221/6 |
| 3,838,663 | 10/1974 | Focke | 194/1 N |
| 4,025,766 | 5/1977 | Ng et al. | 364/403 |
| 4,057,171 | 11/1977 | Hatori et al. | 221/6 |
| 4,075,463 | 2/1978 | Eguizabal | 221/6 |
| 4,180,204 | 12/1979 | Koenig et al. | 235/385 |
| 4,267,942 | 5/1981 | Wick et al. | 221/7 |
| 4,272,757 | 6/1981 | McLaughlin et al. | 377/13 |
| 4,350,238 | 9/1982 | Shah et al. | 221/2 |
| 4,369,442 | 1/1983 | Werth et al. | 364/479 |
| 4,373,133 | 2/1983 | Clyne et al. | 235/385 |
| 4,415,065 | 11/1983 | Sandstedt | 235/383 |
| 4,553,211 | 11/1985 | Kawasaki et al. | 235/381 |

*Primary Examiner*—Jerry Smith
*Assistant Examiner*—John R. Lastova

*Attorney, Agent, or Firm*—Pearne, Gordon, McCoy & Granger

[57] ABSTRACT

A checking system is provided to check the condition of a plurality of storage racks, e.g., the quantity and types of articles in racks in a machine, with the articles being stored along the length of the racks. Rack indicating means is provided in the form of indicia adjacent each of the plurality of racks to identify a plurality of different types or brands of articles. Each of these rack indicating means is subdivided along the length of the respective rack into individual indicating means or indicia, and, as an example, may correspond to the numerical sequence of the respective adjacent article stored in the rack. Interrogation means is cooperable with the indicating means, and this may be a bar code reader to cooperate with bar code indicia to determine data from the rack and individual indicating means. As an example, this may be identifying the particular rack and the sequential number of the articles in the particular track at that instant. A computer is connectable to memory means and to the interrogation means with the memory having an input from the interrogation means to remember data from each indicating means and from the prior history of interrogation. The computer calculates which are those brands of articles which are being dispensed more frequently, and hence are the articles of particular brands or types which should be added into inventory in that particular machine. The foregoing abstract is merely a resume of one general application, is not a complete discussion of all principles of operation or applications, and is not to be construed as a limitation on the scope of the claimed subject matter.

18 Claims, 7 Drawing Figures

QUANTITY CHECKING SYSTEM AND METHOD

BACKGROUND OF THE INVENTION

Various systems have been proposed for checking the condition of storage racks of a machine which dispenses articles. The following U.S. patents are relevant to this subject matter.

U.S. Pat. No. 3,674,173 discloses a vending machine having microswitch pairs for sensing a sold-out condition of a pair of related dispensing columns.

U.S. Pat. No. 3,737,070 discloses a mechanical finger sensor to sense a sold-out condition of a particular shelf in a vending machine.

U.S. Pat. No. 3,838,663 discloses a light beam and shutter arrangement to detect blockages in dispensing chutes of a cigarette vending machine.

U.S. Pat. No. 4,057,171 discloses a vending machine having a microswitch to sense an absence of articles in a vending chute.

U.S. Pat. No. 4,075,463 discloses a hotel room vending unit which electronically records the consumption of goods and which is capable of transmitting this information to the hotel cashier's desk.

U.S. Pat. No. 4,267,942 discloses a dispensing unit with an electronic recording system capable of automatically accounting for items dispensed, date and time of removal, and identification of the recipient using an assigned key.

U.S. Pat. No. 4,350,238 discloses a data acquisition unit utilizing a microcomputer in a vending machine to record, through connection with various selection switches, the number of vends of each product and price data. It is capable of driving a printout device to display such data and simultaneously retaining such data in its memory.

The sensing of the condition of a dispensing or vending machine has heretofore been a very complex procedure, as shown by the aforementioned patents.

SUMMARY OF THE INVENTION

The problem to be solved, therefore, is how to check the condition of storage racks of a vending machine without the use of elaborate systems involving many switches and without any interconnection from the vending machine to a central station. Also, the problem to be solved is how to provide a quantity checking method and a method of retrofitting an existing dispensing machine for checking the condition of that machine.

This problem is solved by a quantity checking system for a plurality of storage racks for storage of articles along the length thereof with the articles adapted to be dispensed from the racks, said system comprising in combination indicating means mounted adjacent each of said plurality of racks and adapted to identify a plurality of different brands of articles, each said indicating means being subdivided along the length of the rack into individual indicating means, each one corresponding to the numerical sequence of the respective adjacent article stored in the rack, interrogation means cooperable with said indicating means for interrogating and determining data from said indicating means as to the particular rack and the sequential number of the last article at one end of a particular rack at that instant, memory means having an input from said interrogation means to remember data from each said indicating means from the prior history of interrogation, and a computer connectable to said memory means to determine which are the brands of articles which are being dispensed more frequently.

The problem is further solved by a quantity checking method by use of an indicia reader for a plurality of storage racks for storage of articles along the length thereof with the articles adapted to be removed from the racks, rack indicia adapted to identify a plurality of different types of articles being subdivided along the length thereof into individual indicia to correspond to the numerical sequence of articles adapted to be stored in the rack and with the rack indicia being adjacent each of said plurality of racks, said method comprising the steps of moving an indicia reader adjacent the rack indicia for reading the individual indicia at the last article at one end of the particular rack at that instant, and inputting data from each said individual and rack indicia into memory means.

The problem is still further solved by a method of retrofitting a plurality of storage racks for checking the quantity of articles stored along the length thereof with the articles adapted to be dispensed from the racks, said retrofitting method comprising the steps of providing on long strips a plurality of distinctive rack indicia to identify different types of articles to be stored in different ones of the storage racks, subdividing the rack indicia along the length thereof into individual indicia, each one being different to correspond to the number of articles adapted to be stored in that particular rack, and mounting said strips one each adjacent to and lengthwise of each storage rack, with one end of the strips positioned at one end of each rack, whereby an indicia reader may be moved adjacent the rack indicia for reading the individual indicia at the last article at the other end of the particular rack at that instant to apply the data from each said rack and individual indicia to memory means.

Accordingly, an object of the invention is to provide a vending machine checking system and method wherein a service man can readily determine the condition of the articles in the machine and, more specifically, the number and brand of those articles.

Another object of the invention is to provide a machine condition checking system to aid in keeping a fresh stock of articles in the machine, and yet to minimize inventory in the machine.

A further object of the invention is to provide a way to retrofit a given dispensing or vending machine so that the existing machines may still be used, yet easily retrofitted for inventory checking purposes.

Other objects and a fuller understanding of the invention may be had by referring to the following description and claims, taken in conjunction with the accompanying drawing.

DESCRIPTION OF THE PREFERRED EMBODIMENTS

Figure 1:
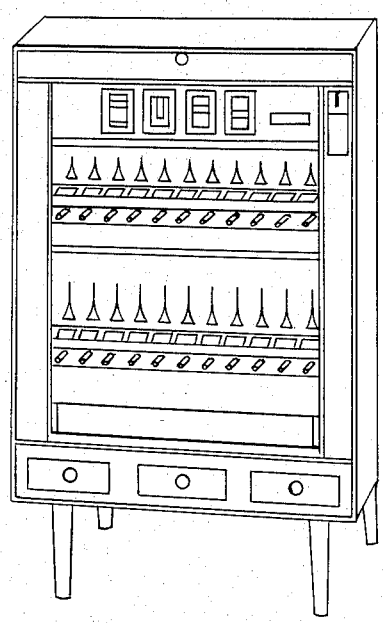
FIG. 1 is a perspective view of a dispensing machine with which the invention may be used.
Figure 2:
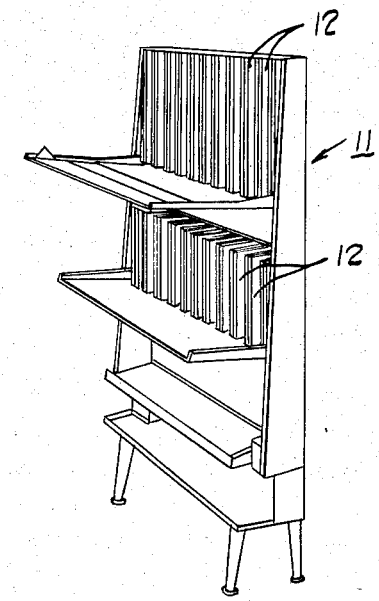
FIG. 2 is a perspective view of the machine of FIG. 1, opened to show the storage racks.
Figure 3:
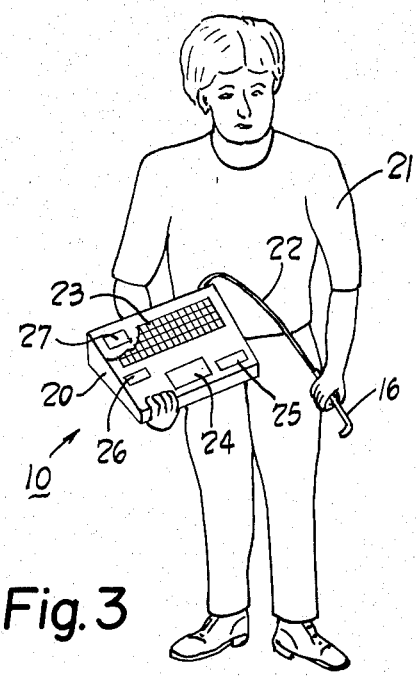
FIG. 3 is a perspective view of the computer and bar code reader.
Figure 5:
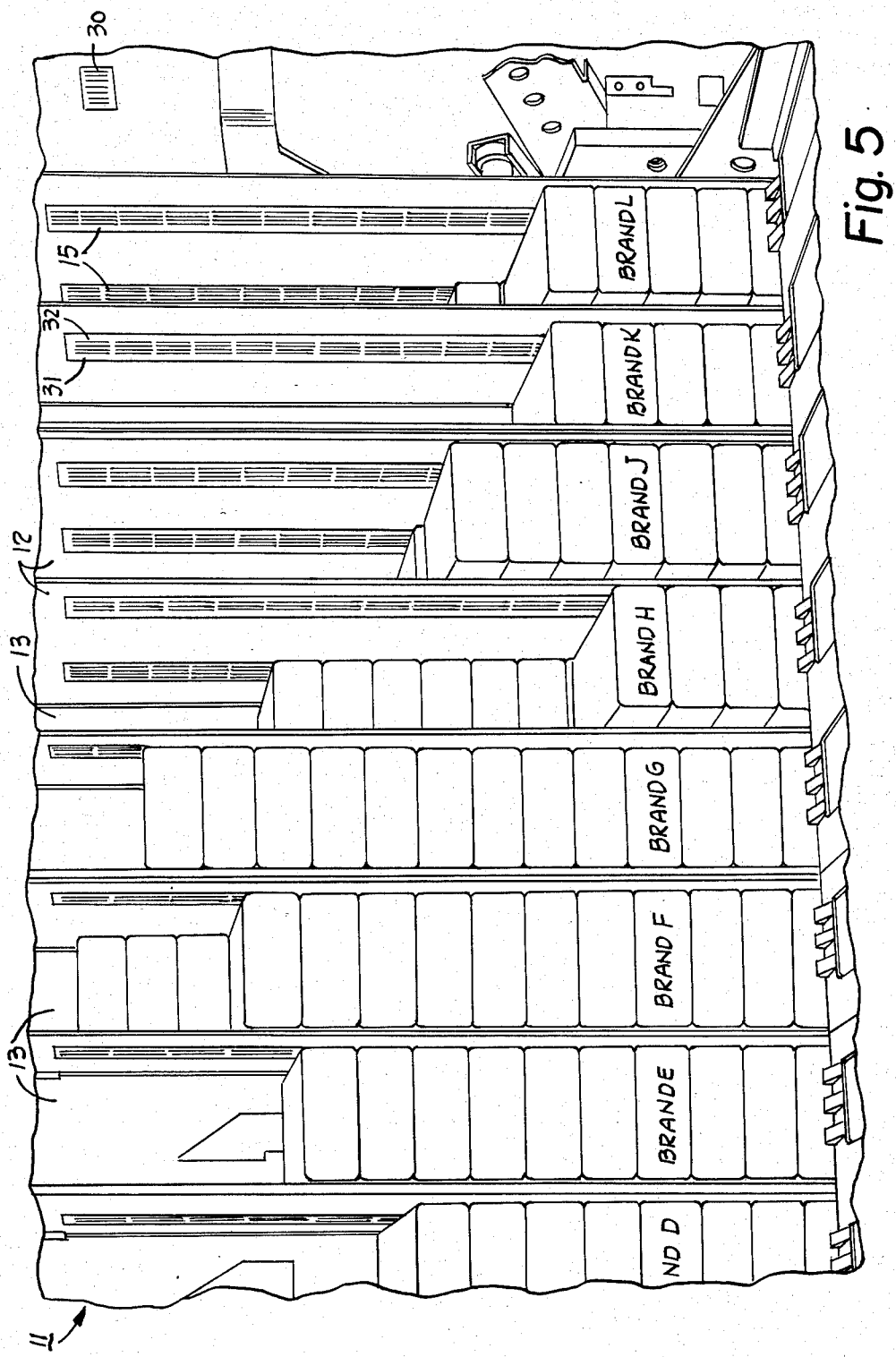
FIG. 5 is an enlarged perspective view of the dispensing machine, opened to show the articles therein.

FIGS. 1, 2, and 5 illustrate a dispensing machine 11 with which the invention may be used. The machine may be one which dispenses articles without charge or one which dispenses articles upon operation of the proper key, such as a drug dispensing machine. The particular embodiment illustrated in FIGS. 1, 2, and 5 is a dispensing machine which is a cigarette vending machine. The machine has a plurality of storage racks 12, and these racks may be horizontal, at an angle, or vertical as shown. In FIG. 1, the general front view of the vending machine is illustrated, and in FIG. 2 the front panel has been removed and the inner cover pivoted downwardly to act as a shelf, and thus to expose the storage racks 12. FIG. 5 is an enlarged view of a plurality of such storage racks, e.g., the upper portion of the machine of FIG. 2.

The storage racks 12 are adapted to store a plurality of articles along the length of such racks, and in the embodiment shown these articles are all of similar size and shape, for example, packages of cigarettes of different brands, namely, from brand D through brand L. Different quantities of these articles are shown in each of the various racks, as might be typical when being opened for restocking by a service man. The present invention provides a system and method 10 for checking the condition of the machine 11, and more specifically checks the level or quantity of articles in the machine in the particular storage racks 12.

The dispensing machine 11 shown in the figures is one which has a shift column 13 to the rear of the primary column or storage rack 12. In this particular type of cigarette vending machine, these shift columns automatically move forward when all of the articles in the primary column at the front of the machine have been dispensed. This shift column 13 is shown in its rear position for brands F, H, J, and L, and is shown in the forward position for brands D, E, G, and K, in FIG. 5. The dispensing of articles may be from the top or from the bottom, and in this particular machine they are loaded from the top and fed by gravity to the bottom, whereat they are dispensed.

Indicating means 15 is provided in the machine 11 to indicate the level or quantity of articles, as well as the types of articles, in the machine. This indicating means may take one of many forms, and in the preferred embodiment is in the form of indicia. This indicia may take one of many forms, such as digital, alphanumeric, braille, or magnetic, but in the preferred embodiment is in the form of a bar code. There are several different bar codes: UPC, EAN, 2 of 5 Interleave, and the code used herein, which is 3 of 9. The indicating means 15 is cooperable with interrogation means 16, which is in the appropriate form to interrogate the indicating means or indicia 15. The interrogation means 16 would be appropriate to read braille, magnetic characters, alphanumeric characters, or digital information, and in this preferred embodiment is a wand to read the bar code indicia 15. This wand may be of the type which carries a self-contained light source and a closely adjacent photoreceptive means to read the reflected light from the bar code 15.

A computer 20 is used with the system, and in the preferred embodiment this is a portable or microcomputer which may be readily carried by the service man 21 as he makes his rounds to service the machines 11 to restock them. The computer 20 includes a memory 27 and is connected by a flexible cable 22 to the wand 16. The computer has the wand 16 and also a typewriter-like keyboard 23 as input devices. The computer has output means, including an LCD display panel or screen 24 and a small printer 25. The printer is the one which has printed out the program for the computer which is annexed hereto as Appendix A. Another input and output device for the computer is a microcassette play/record device 26. One portable computer suitable for use with the present invention is the Epson HX-20 of Epson America, Inc.

The indicia 15 generally includes three things: a machine indicia 30, rack or column indicia 31, and individual indicia 32. The machine indicia 30 identifies that machine. The rack indicia identifies which of the plurality of racks in the machine is being interrogated. For example, one type of cigarette vending machine contains 22 columns plus 22 additional shift or reserve columns to the rear of the primary columns, and the rack indicia 31 would identify these individual racks or columns. The individual indicia 32 may physically be separate from or immediately adjacent the rack indicia, and the latter is that which is shown. Thus, when the wand is moved across one particular bar code in a horizontal direction at or adjacent the top of one of the cigarette packages, it reads the rack indicia and also the individual indicia. The latter gives the level or quantity of articles in that particular column, and the former identifies the column and, indirectly, the brand of articles.

Figure 4:
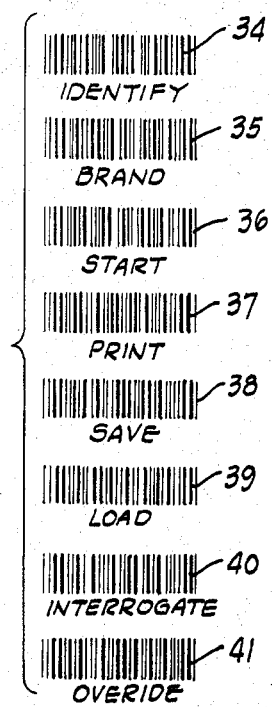
FIG. 4 is a view of typical bar codes used in the system.

When a service man enters an establishment to service a vending machine, he will use his service key to take off the front panel of the machine and lower the pivoted shelf to the position shown in FIG. 2. He then wands the machine indicia 30 and this identifies that particular machine in that particular establishment. The service man takes from his supply of tapes a microcassette tape having a label identifying it as being for that particular machine in that establishment. In an alternative method, the machine image may be stored in some other medium, such as a floppy disc or solid-state memory. In such cases, the media could be attached to or a part of the computer. In this present example, the service man inserts the cassette into the computer 20 and opens his service manual to a page which has a plurality of bar code indicia such as those shown on FIG. 4. These are shown as eight in number, and are different commands such as IDENTIFY 34, BRAND 35, START 36, PRINT 37, SAVE 38, LOAD 39, INTERROGATE 40, and OVERRIDE 41. The service man wands the load command 39 and the computer recognizes this as a command to start the tape player and the computer reads the vending machine image from the tape and verifies that it is the correct vending image by comparing it with the machine label 30 previously wanded. If the machine label and the tape do not agree, the computer gives a "WRONG TAPE" message. The service man then inserts the correct tape and repeats this step. Next, the service man will wand the INTERROGATE command 40, which sets the INTERROGATE mode in the computer. The service man then wands the level in each and every column which contains inventory, including the shift columns. The computer display panel 24 then displays which columns have been measured and which have not been measured. For example, the computer screen may display an asterisk for those columns which have been measured and actually display a column number for those columns or racks in which neither the primary nor shift column has been measured.

The service man next turns on the printer and then wands the PRINT command 37. A printout then comes from the printer which contains the current vending machine image, the restocking order, and the sales summary. This command may be given at any time in order to examine the current vending machine image. The tape which has been used to load the vending machine image into the computer contains data from the prior history of interrogation. This may be merely the last time the machine was interrogated during servicing or the last two times, as an example. This prior history of interrogation shows which brands of articles are being dispensed more frequently and hence are the articles of particular brands which should be added into the inventory in that particular machine.

It is possible for the service man to override the restocking order. To do so, he wands the OVERRIDE command 41, and then wands the level to which the modified column has actually been restocked. This might occur if he knows that conditions have changed in the establishment in which the dispensing machine is located.

After the machine has been serviced and restocked and interrogated, the service man wands the SAVE command 38. The tape will rewind and then record the stock to the vending machine image on the tape. This takes, for example, twenty seconds, and the service man then closes the machine and restores it to the condition shown in FIG. 1. A copy of the printout showing the current vending machine image, the restocking order, and the sales summary may be left with the owner or manager of the establishment for his record-keeping purposes.

The present invention is one which permits easy retrofitting of a machine for checking the condition of that machine. The first time that a service man with the computer 20 visits an establishment, he may readily retrofit such dispensing or vending machine. The indicating means 15 may be the rack and individual indicia 31 or 32 printed on thin strips of paper or plastic with an adhesive backing. The service man will remove the front panel and open the machine so that it appears as shown in FIG. 2. To identify the machine, the service man would wand the IDENTIFY command 34, and the computer will ask for a machine number. The service man will select a machine number from a plurality of premade machine number bar code labels. The service man may type the machine number into the computer and then press the RETURN key. The selected bar code label is then affixed to the appropriate spot in the machine, such as the upper right inside surface, as shown in FIG. 5. The computer then asks for the name of the vending machine, and the service man will type a name, e.g., the name of the location or establishment. The service man presses the RETURN key, and this is entered into the computer memory.

The next step in retrofitting is to assign brands to columns or racks. The service man selects rack indicia which are the paper or plastic labels and adheres them to the inside surface of the column, with one end of each label adjacent one end of the column. In this type of cigarette vending machine, since they are dispensed from the bottom, it is the bottom of the paper label which is placed adjacent the bottom of the particular column. Individual indicia on each of these paper labels then might have bar code indicia in which the individual indicia has a sequence of numbers from 1 through 18, for a total of 1 through 18 packs of cigarettes in that particular column.

The service man's service manual will also have bar codes for different brands of cigarettes. The service man next assigns certain brands to columns. To do this, he wands the BRAND mode 35. The service man next wands a column and then wands a BRAND bar code in his service manual from the corresponding bar coded data sheets. The service man does this for as many columns as necessary up to the maximum that the vending machine will hold.

The service man may change brands, and to do this, he wands the BRAND command 35, then wands the bar code for the column to be changed, and then wands the bar code for the new brand. In an alternative method, the UPC bar code on the carton or package can be wanded.

The starting inventory for the particular machine is next entered into the computer. The vending machine is stocked with the starting inventory, and the service man wands the START command 36. He wands the level in each column, including the shift columns. The data as to the starting inventory is then saved by the service man wanding the SAVE command 38. The tape will then rewind and record the vending machine image onto the tape.

Figure 6:
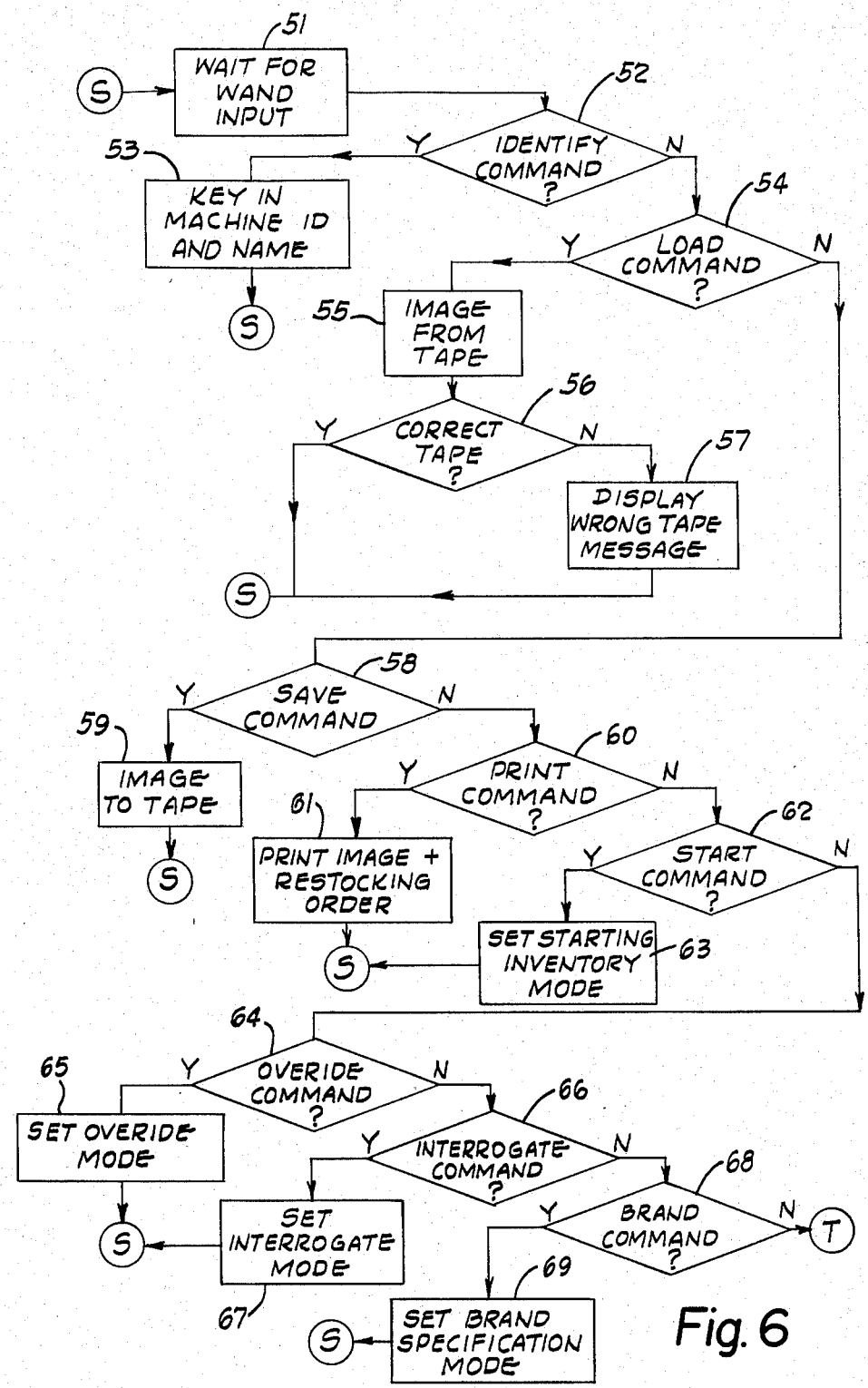
FIGS. 6 and 7 together form a flow chart describing the operation of the system.
Figure 7:
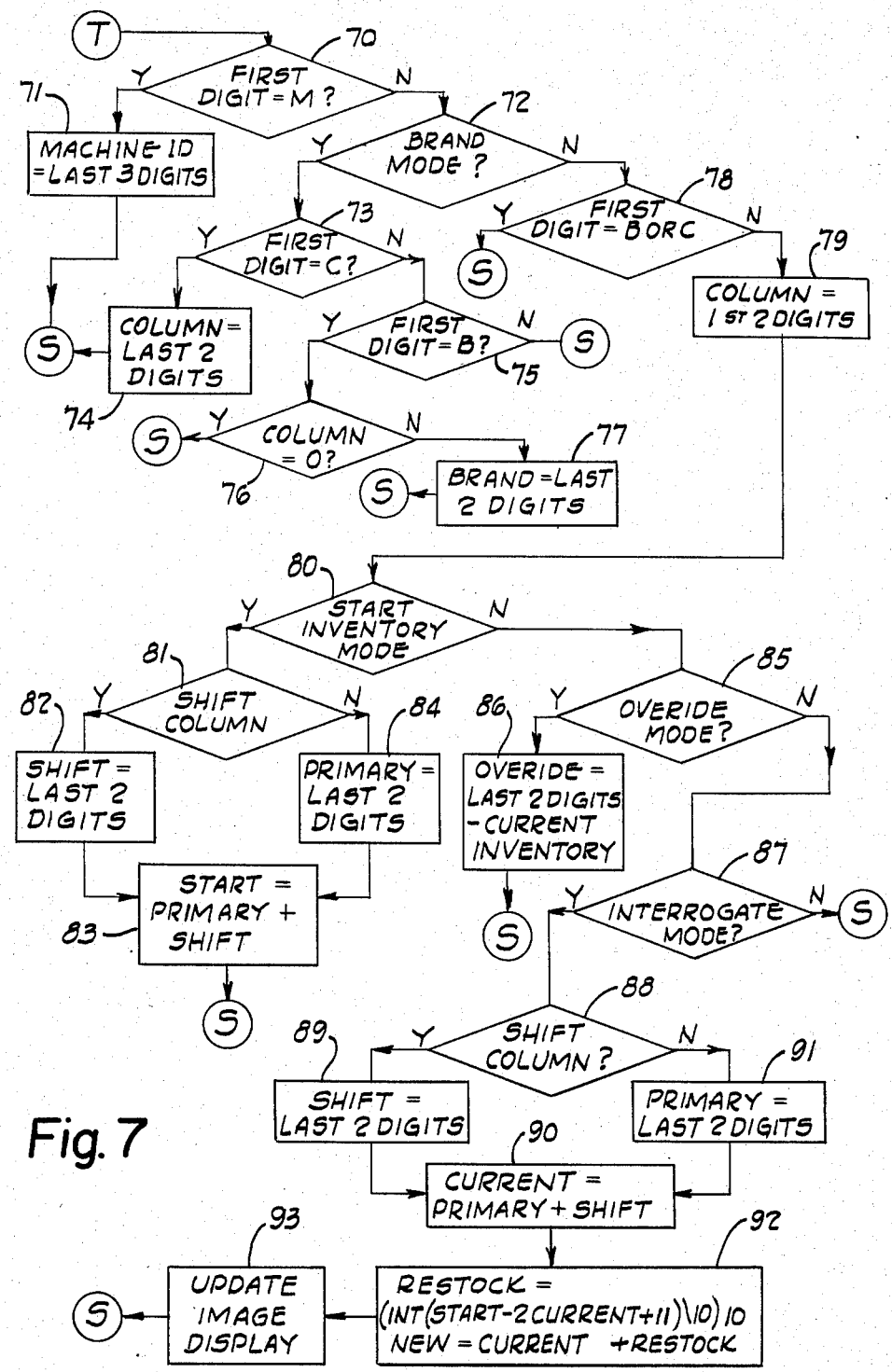

FIGS. 6 and 7 show a flow chart of the program used to control the computer 20. The letter "S" indicates the start of the program, and in this flow chart the various decision, function, and command blocks will be identified as steps in the flow chart. Step 51 indicates that the computer waits for a wand input. Step 52 decides whether this is the IDENTIFY command 34. If it is, step 53 indicates that the computer asks for a machine number and the service man would then key in the machine identification or number and the name of the location or establishment. The program then returns to the start.

Step 54 asks whether this is the LOAD command 39, and if it is, then step 55 indicates that the vending machine image is loaded from the tape. Step 56 asks whether this is the correct tape, and if it is, then the program returns to the start. If it is not, then step 57 indicates that the computer displays the wrong tape message and the program returns to the start.

Step 58 in the flow chart is a decision block, asking whether this is a SAVE command. If it is, then step 59 indicates that the vending machine image is transferred to the tape, and the program returns to the start. If it is not a SAVE command, then step 60 asks whether this is a PRINT command. If it is, then step 61 indicates that the printer prints out the vending machine image and the restocking order. Then the program starts over. If it is not the PRINT command, then the step 62 asks whether it is the START command. If it is, then step 63 shows that the computer is set for the starting inventory mode. If it is not a START command, then step 64 indicates that the question is asked whether it is an OVERRIDE command. If it is, step 65 shows the computer is set in the OVERRIDE mode, and the program starts over. If it is not, the step 66 shows that the question is asked whether it is an INTERROGATE command. If it is, step 67 shows that the computer is set in the INTERROGATE mode, and the program starts over. If it is not, step 68 shows that the question is asked whether it is the BRAND command. If it is, then step 69 shows the computer is set in the BRAND specification mode, and the program starts over. If it is not, then the program advances to point T, that part of the flow chart shown on FIG. 7, whereat the step 70 asks whether the first digit is an "M". If it is, then step 71 shows that the particular machine is identified by the last three digits, and the program starts over. If it is not, then step 72 asks the question whether it is the BRAND mode. If it is, then step 73 shows the question is asked whether the first digit is a "C". If it is, then step 74 shows that the column is identified by the last two digits, and the program starts over. If the first digit is not a "C", then step 75 shows the question is asked whether the first digit is a "B". If it is, then step 76 shows the question is asked whether the column is a zero, and if it is, the program starts over. If it is not, the step 77 shows that of the numbers read, the last two digits show the brand, and the program starts over. If the first digit read is not a "B" in step 75, then the program starts over.

In step 72, where the question was asked whether this was the BRAND mode, if the answer is "No," then step 78 shows the question is asked whether the first digit is a "B" or a "C". If the answer is affirmative, then the program starts over; if the answer is negative, then step 79 shows that in the number that has been read, the first two digits indicate the column.

The program continues with step 80, which asks whether this is the starting inventory mode. If it is, then step 81 shows the question is asked whether this is the shift column. If it is, then step 82 shows the shift column number is the last two digits. Step 83 shows the program continues with the starting inventory being equal to the quantity in the primary and shift columns, and the program starts over. If the answer to step 81 is negative, then step 84 shows that the number of the primary column is the last two digits and the program continues to step 83. If the answer to step 80 is negative, then step 85 shows that the question is asked whether the program is in the OVERRIDE mode. If the answer is affirmative, then step 86 shows that the override restock value equals the last two digits minus the current inventory, and the program starts over. If the answer to step 85 is negative, then step 87 shows the question is asked whether this is the INTERROGATE mode. If it is not, then the program starts over. If the answer is positive, then step 88 shows that the question is asked whether this is the shift column. If the answer is affirmative, then step 89 shows that the quantity in the shift column equals the last two digits, and the program proceeds to step 90, where the current inventory equals the quantities in both the primary and shift columns. If the answer to step 88 is negative, then step 91 shows that the quantity of articles in the primary column is equal to the last two digits, and the program goes to step 90. After step 90, step 92 shows that a calculation is made to determine the quantity for restocking. This is a calculation of the formula of the starting inventory minus twice the current inventory plus 11, divided by 10, and then the integer portion of that quotient multiplied by 10. As an example, if the starting inventory is 17 and the current inventory is 10, then the integer is 0, and 0×10 means that 0 units is indicated for restocking. If the starting inventory is 17 and the current inventory is 9, then the integer of that quotient is 1, and 1×10 means 10 units or 1 carton of cigarettes is indicated for restocking. If the starting inventory is 17 and the current inventory is 4, then the integer of that quotient is 2, and 2×10 means that 20 packs, or 2 cartons, should be restocked in the machine. After step 92, step 93 indicates that the vending machine image display is updated, and the program starts over.

The machine condition checking system 10 utilizes the data obtained from the interrogation means 16 as it interrogates the indicating means 15, and compares it with data from the memory means 27. The computer is connectable to this memory means, and operates on the data from the interrogation means to determine those brands of articles which are being dispensed more frequently, and hence are the articles of particular brands which should be added into the inventory of the particular machine. Speaking specifically of a cigarette vending machine, if the particular brand at that particular location is not being sold very frequently, then there might be six or eight packs of cigarettes remaining in a particular column. A service man might add one, or even two, cartons of cigarettes to that particular brand, yet this could be a waste in two respects. First, it would add cigarette packs where they were not needed and hence the inventory would not be the freshest available cigarettes and, second, it would be a waste of inventory for the cigarette distributor. If only three or four packs of cigarettes are dispensed per week or per service interval, then the present program will show that this particular brand should not be restocked. Rather, the service man should wait until the next service interval. This will not only save inventory for the cigarette distributor, but will keep the stock at its most fresh condition.

In the preferred embodiment, it will be noted that the articles are loaded from the top and dispensed from the bottom, and that the level of the articles is interrogated adjacent the topmost article in each particular rack or column. The indicia are shown as being bar codes which are vertical lines and spaces, and in that case, the indicia reader or wand 16 is moved transversely to the rack to read the individual indicia exposed above the topmost article in that particular rack at that instant. Preferably, the wand 16 has about a 70° bend near the working tip, for better reading of the indicia inside the columns. The wand, of course, reads the bar codes and translates the rack indicia and individual indicia into digital information for processing by the computer 20. This computer does the calculating of the data in the memory means and from data of the current inventory to establish the restocking order.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the program and the combination and arrangement of structure and method steps may be resorted to without departing from the spirit and the scope of the invention as hereinafter claimed.

APPENDIX "A"

```
5 REM COPYRIGHT 1984           220 CLS                        1200 IF FD$×"C"GOTO 12
  ACME COMPANY                  222 SOUND 13,5                 04
  ALL RIGHTS RESERVED           240 PRINT "PRINTING OUTP       1202 CN=SD: GOTO 62
7 REM WANDER                    UT"                            1204 IF FD$×"B" OR CN=0
```

APPENDIX "A"-continued

```
10 CLEAR 500,1200
15 DEFINT A-Z
20 DEFFIL 8,0
30 X$="X"
50 DIM TRU(36),CIGS(36),BRAND$(36)
52 DIM OLD(36),INV(36),ADD(36),BEG(36)
53 DIM PRIM(72),STAR(72)
54 DIM INDX(36),MEAS(36)
55 NS=7
60 DEFUSR0=&H13C3
61 A$=" "
62 CLS
63 PRINT "WAND INPUT"
65 A$=MID$(USR0(A$),1)
69 SOUND 8,3
70 IF A$="LOAD" GOTO 100
71 IF A$="SAVE" GOTO 500
72 IF A$="PRIN" GOTO 220
73 IF A$="STAR" GOTO 1050
74 IF A$="OVER" GOTO 1100
75 IF A$="INTE" GOTO 1105
76 IF A$="BRAN" GOTO 1075
77 IF A$="IDEN" GOTO 3000
78 IF A$=" " THEN DUM$=INKEY$
80 FD$=MID$(A$,1,1)
81 IF FD$="M" GOTO 3100
82 SD=VAL(MID$(A$,3,2))
84 IF REC=1 GOTO 1200
88 IF FD$="B" OR FD$="C" GOTO 62
90 FD=VAL(MID$(A$,1,2))
92 IF INV=1 GOTO 3200
94 IF ADD=1 THEN ADD(FD)=SD-INV(FD)
95 IF PIC=1 GOTO 1250
99 GOTO 62
100 WIND
105 CLS
107 PRINT "READING TAPE"
110 OPEN "I",#1,"CAS0:INVN"
120 INPUT #1,ODTE$,OTME$
122 INPUT #1,NME$
123 INPUT #1,MN,NS
124 IF VMN=MN GOTO 127
125 PRINT "WRONG TAPE": SOUND 13,5:CLOSE #1
126 SOUND 13,5: SOUND 13,5: GOTO 62
127 FOR I=1 TO NS
128 INPUT #1, INDX(I),DUM,DUM,OLD(I)
130 INV(I)=0: ADD(I)=0: MEAS(I)=0
140 PRIM(I)=0: PRIM(I+22)=0
151 GET% INDX(I),CIG$
155 BRAND$(I)=MID$(CIG$,4,9)
157 NEXT I
160 SOUND 13,5
162 GOTO 62
249 OLDT=0: INVT=0: SALES=0: ADDT=0: BEGT=0
250 FOR I=1 TO NS
251 BEG(I)=INV(I)+ADD(I)
252 OLDT=OLDT+OLD(I)
253 INVT=INVT+INV(I)
254 ADDT=ADDT+ADD(I)
255 BEGT=BEGT+BEG(I)
256 NEXT
340 LPRINT DATE$;" "; TIMES$-
342 LPRINT NME$
344 LPRINT
345 LPRINT TAB(9);"OLD"; TAB(13);"INV";TAB(17);"ADD"
348 FOR I=1 TO NS
358 LPRINT I;TAB(4);BRAND$(I);TAB(9);OLD(I);TAB(13);INV(I);TAB(17);ADD(I)
360 NEXT I
388 LPRINT
389 SALES=OLDT-INVT
390 LPRINT OLDT;INVT;SALES;ADDT;BEGT
425 LPRINT
428 GOTO 62
500 CLOSE #1
505 WIND
506 CLS: PRINT "WRITING TAPE"
510 OPEN "O",#1,"CAS0:INVN"
515 PRINT #1,DATE$;TIMES
520 PRINT #1,NME$
525 PRINT #1, MN;NS
530 FOR I=1 TO 7
540 PRINT #1,INDX(I),INV(I),ADD(I),BEG(I)
550 NEXT I
560 CLOSE #1
562 GOTO 62
1050 ADD=0: INV=1: REC=0: PIC=0: GOTO 62
1075 ADD=0: INV=0: REC=1: PIC=0: CN=0: GOTO 62
1100 ADD=1: INV=0: REC=0: PIC=0: GOTO 62
1105 ADD=0: INV=0: REC=0: PIC=1
1110 CLS
1112 FOR I=1 TO NS
1115 GOSUB 2114
1120 NEXT
1122 GOTO 65
1205 IF CN=0 THEN RETURN
1210 INDX(CN)=SD
1212 GET% INDX(CN),CIG$
1214 BRAND$(CN)=MID$(CIG$,4,9)
1216 GOTO 62
1250 PRIM(FD)=SD
1251 IF FD>22 THEN FD=FD-22
1252 INV(FD)=PRIM(FD)+PRIM(FD+22)
1255 ADD(FD)=((OLD(FD)-2*INV(FD)+11)\10)*10
1260 BEG(FD)=INV(FD)+ADD(FD)
1265 MEAS(FD)=1
1270 I=FD: GOSUB 2114
1300 GOTO 65
2114 Y=INT(ABS(I/10-.01)): X=INT(I-Y*10)
2116 LOCATE X-1,Y,0
2118 IF X)=10 THEN X=X-10
2120 IF MEAS(I)=0 THEN PRINT USING "#";X;
2122 IF MEAS(I)=1 THEN PRINT USING "!";"*";
2124 RETURN
3000 REM IDENTIFY
3005 INPUT "MACHINE #", MN
3010 INPUT "NAME",NME$
3030 GOTO 62
3100 REM MACHINE #
3105 VMN=VAL(MID$(A$,2,3))
3110 GOTO 62
3200 STAR(FD)=SD
3202 IF FD>22 THEN FD=FD-22
3204 OLD(FD)=STAR(FD)+STAR(FD+22)
3206 GOTO 62
9999 END
```

What is claimed is:

1. A quantity checking system for a plurality of storage racks for storage of articles in a vending machine with the articles adapted to be dispensed from the racks, said articles adapted to be stored along the length of each rack in numerical sequence, said system comprising in combination:

means for dispensing articles from the racks;

passive indicia mounted adjacent each of said plurality of racks and adapted to identify a plurality of different brands of articles;

each of said indicia being subdivided along the length of the rack into passive individual indicia, each one corresponding to the numerical sequence of the respective adjacent article stored in the rack;

interrogation means unconnected to, yet cooperable with, said indicia for interrogating and determining data from said indicia as to a particular rack and the sequential number of the last article near one end of the particular rack at that instant;

memory means having an input from said interrogation means to store data from each said indicia from each interrogation of the plurality of storage racks and to store data from at least one prior interrogation of the plurality of storage racks; and a computer connectable to said memory means to determine which brands of articles are being dispensed more frequently.

2. A quantity checking system as set forth in claim 1, wherein said storage racks are vertical.

3. A quantity checking system as set forth in claim 2, wherein said articles are dispensed from the lower end of each rack and the indicia is adapted to be interrogated adjacent the topmost article in each particular rack.

4. A quantity checking system as set forth in claim 3, wherein said interrogation means is an indicia reader; and said indicia reader may be rested on the topmost one of the articles in a particular rack and moved transversely to the rack to read the individual indicia exposed above the topmost article in that particular rack at that instant.

5. A quantity checking system as set forth in claim 1, wherein said interrogation means is an indicia reader.

6. A quantity checking system as set forth in claim 5, wherein said indicia are printed on thin labels adhered to the inside of each of said storage racks.

7. A quantity checking system as set forth in claim 5, including indicia translator means translating each of said indicia read by the reader into digital information.

8. A quantity checking system as set forth in claim 1, including a printer connectable to said memory means to print out an inventory list of the number of articles contained in each rack at the time of interrogation.

9. A quantity checking system as set forth in claim 8, wherein sid indicia is a bar code and said interrogation means is a bar code reader.

10. A quantity checking system as set forth in claim 8, wherein said printer additionally prints out a restocking order.

11. A quantity checking system as set forth in claim 1, including the computer having an output to indicate which articles of particular brands should be added into inventory in particular storage racks.

12. A quantity checking method by use of an indicia reader for a plurality of storage racks in a vending machine for storage of plural articles in numerical sequence along the length of each rack with the articles adapted to be removed from the racks;

passive rack indicia to identify a plurality of different types of articles being subdivided along the length of the rack indicia into individual indicia to correspond to the numerical sequence of the plural articles adapted to be stored in a particular rack, and with the rack indicia being adjacent each of said plurality of racks;

said method comprising the steps of:

resting a single active indicia reader on an article near one end of a particular rack and adjacent to the passive rack indicia and moving said indicia reader along said article to read the individual indicia at said article at the time said reader is moved; and inputting data from each said individual and rack indicia into memory means.

13. A quantity checking method as set forth in claim 12, wherein said racks are substantially vertical and the articles are adapted to be removed from the lower end of the racks, including resting said indicia reader on the topmost article in a particular rack and moving the indicia reader substantially horizontally along the topmost article to read the individual indicia.

14. A quantity checking method as set forth in claim 12, including moving the indicia reader transversely of the rack for reading the individual indicia.

15. A quantity checking method as set forth in claim 12, wherein said plurality of storage racks are in a machine, and said moving step includes moving said indicia reader adjacent machine indicia to identify a particular machine.

16. A quantity checking system as set forth in claim 15, including calculating from data in the memory means and from data of the current inventory which types of articles are being dispensed more frequently.

17. A quantity checking system as set forth in claim 16, including adding articles into inventory in the particular storage racks for those more frequently dispensed types of articles but not to the less frequently dispensed types of articles in order to minimize the inventory of articles stored in the racks at any given time.

18. A quantity checking method as set forth in claim 12, including providing memory means and inputting data of the current inventory into said memory means.

* * * * *

UNITED STATES PATENT AND TRADEMARK OFFICE
CERTIFICATE OF CORRECTION

PATENT NO. : 4,639,875

DATED : January 27, 1987

INVENTOR(S) : Joseph N. Abraham and Donald S. Scipione

It is certified that error appears in the above-identified patent and that said Letters Patent is hereby corrected as shown below:

ABSTRACT
Line 17, "track"
   should read as --rack--

Column 11, Claim a, line 42, "sid"
   should read as --said--

Signed and Sealed this

Eighteenth Day of August, 1987

*Attest:*

DONALD J. QUIGG

*Attesting Officer*     Commissioner of Patents and Trademarks